United States Patent [19]

Polan

[11] 3,744,401
[45] July 10, 1973

[54] GRAIN TREATING AND COOKING APPARATUS

[76] Inventor: Garlan R. Polan, Route 5, Hereford, Tex. 79045

[22] Filed: Dec. 27, 1971

[21] Appl. No.: 212,398

[52] U.S. Cl. .................................................. 99/352
[51] Int. Cl. ................................................ A23k 1/00
[58] Field of Search ...................... 99/235, 234, 236, 99/237, 238, 386, 427, 443, 352, 478, 494, 534, 645, 646, 323.11, 323.9; 241/109, 221, 222–223

[56] References Cited
UNITED STATES PATENTS

| | | | |
|---|---|---|---|
| 2,504,110 | 4/1950 | Davis et al. | 99/386 X |
| 2,629,310 | 2/1953 | Harder | 99/235 R |
| 3,083,102 | 3/1963 | Leduc | 99/237 R |
| 3,202,084 | 8/1965 | Hale et al. | 99/238 R X |
| 3,243,264 | 3/1966 | Hickey | 99/236 C X |
| 3,263,592 | 8/1966 | Hickey et al. | 99/235 R |
| 3,336,137 | 8/1967 | Hickey | 99/237 R X |
| 3,471,298 | 10/1969 | Hirahara | 99/237 R X |

Primary Examiner—John Petrakes
Assistant Examiner—Arthur O. Henderson
Attorney—Rupert J. Brady, James G. O'Boyle et al.

[57] ABSTRACT

Grain is fed to an auger conveyor where, depending upon the moisture of the grain being treated, water or a chemical solution is sprayed onto the grain to increase the moisture constant thereof. The moistened grain is discharged into a hopper having a controlled discharge end spaced above one end of an endless conveyor which is adapted to travel through a heat source. A predetermined layer of moistened grain is deposited from the hopper onto the endless conveyor and carried into the heat source whereby the grain is quick-cooked or heated thereby causing the inner moisture of the grain to expand and explode or "pop" the grain. The "popped" grain is then discharged from the end of the endless conveyor into a roller mill, whereby the grain is crushed and then packaged for future use.

10 Claims, 5 Drawing Figures

PATENTED JUL 10 1973　　　　　3,744,401

GRAIN TREATING AND COOKING APPARATUS

BACKGROUND OF THE INVENTION

In order to render feed for livestock more palatable and to facilitate the digestion of the grain by the livestock, it has been proposed to heat the moistened grain to cause the grain kernels to explode or "pop," before the milling or rolling thereof. While various types of apparatus have been proposed for the heating and grinding of grain for livestock, they have been subject to certain disadvantages, particularly in the conveying and the heating of the grain which restricted the amount of grain which could be treated and cooked in a given period of time.

In order to overcome the disadvantages experienced in hitherto employed grain treating apparatus, after considerable research and experimentation, the apparatus of the present invention has been devised which comprises, essentially, an auger conveyor for supplying moistened grain to a heated hopper. One end of an endless conveyor is disposed beneath the discharge end of the hopper for receiving a controlled flow of moistened, preheated grain from the hopper. A radiant heater is disposed above the endless conveyor and extends along the length thereof, whereby a predetermined layer of moistened grain is deposited onto the endless conveyor and carried into the heat source whereby the grain is quick-dried thereby causing the inner moisture of the grain to expand and explode or "pop" the grain. A rolling mill is disposed adjacent the discharge end of the endless conveyor whereby the "popped" grain is fed into the mill and crushed, and then packaged for future use.

Figure 1:
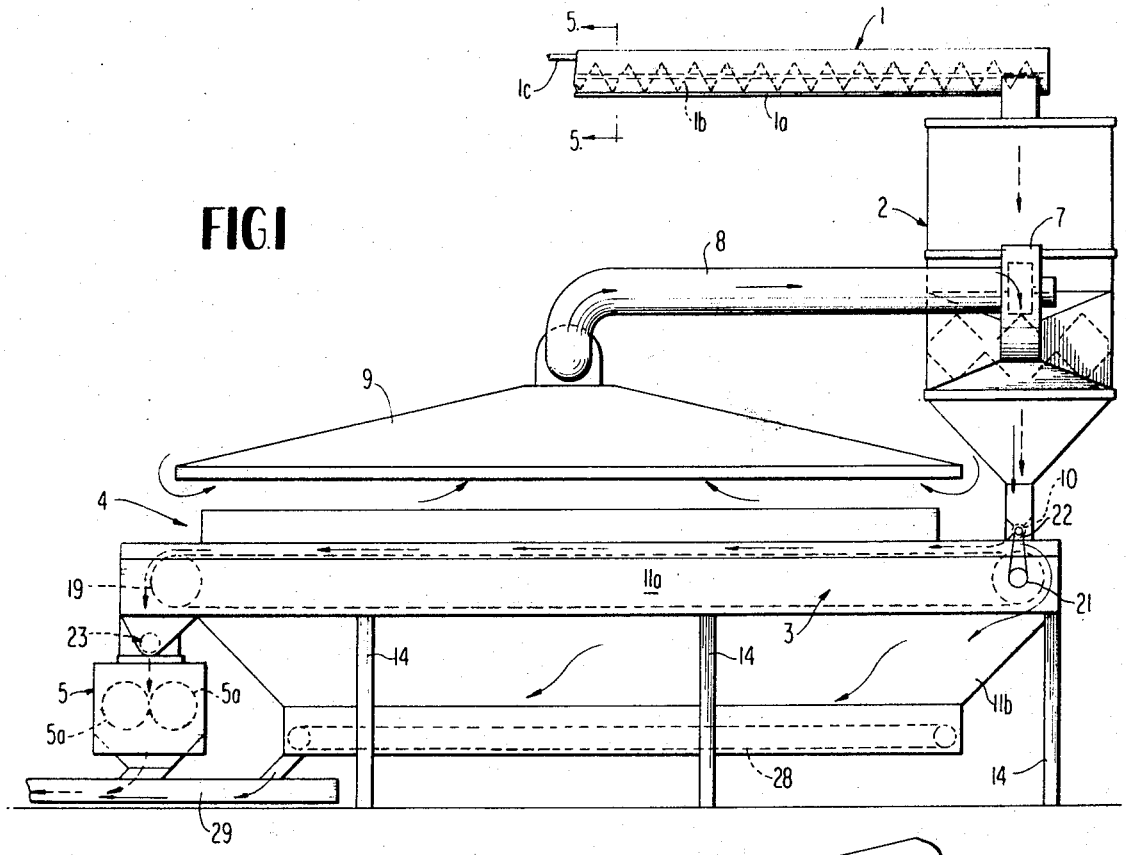
FIG. 1 is a side elevational view of the grain treating and cooking apparatus of the present invention.

Referring to the drawings and more particularly to FIG. 1, the apparatus of the present invention comprises, essentially, an auger conveyor 1 which feeds moistened grain into a hopper 2, having its discharge end positioned above one end of an endless conveyor 3. The conveyor 3 carries the moistened grain under a radiant heater 4 to thereby explode or "pop" the grain, the popped grain then being discharged into a roller mill 5.

Figure 5:
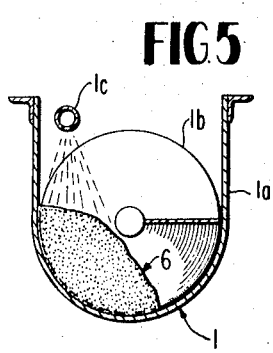
FIG. 5 is a view taken along line 5—5 of FIG. 1.

As will be seen in FIG. 5, the auger conveyor includes a trough 1a having an auger 1b mounted therein. A nozzle assembly 1c is disposed longitudinally of the trough for spraying water or a solution of water and a chemical on the grain 6 being conveyed. Whether or not the grain is sprayed with the fluid depends upon the natural moisture content of the grain. For some grains additional moisture will not be needed, while others will not only need additional moisture but also they will need to be treated with a chemical to break down the natural waxy film on the surface of the grain to allow the water to penetrate the grain.

Figure 4:
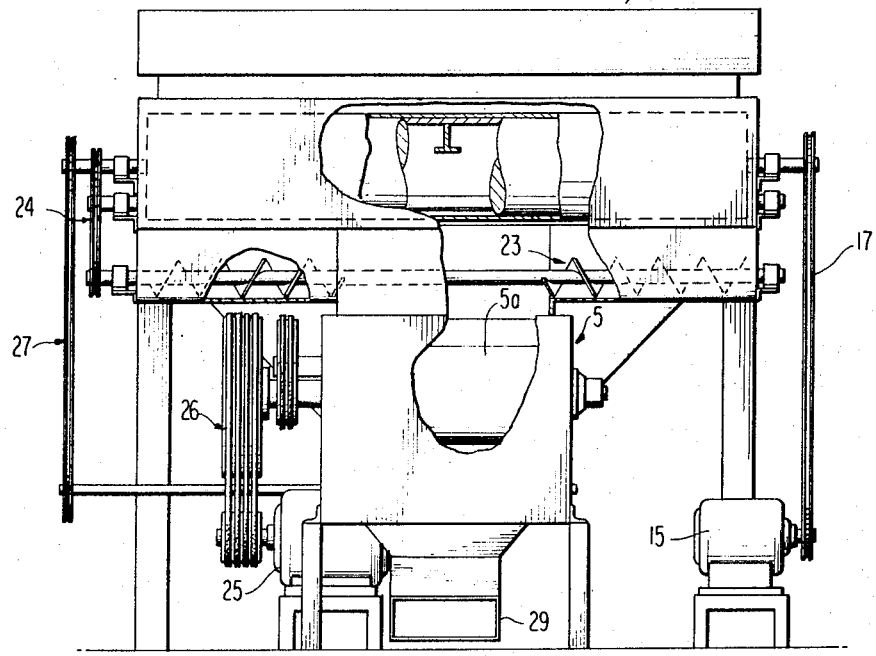
FIG. 4 is an enlarged, fragmentary, side elevational view of the hopper shown in FIG. 1.
Figure 4:
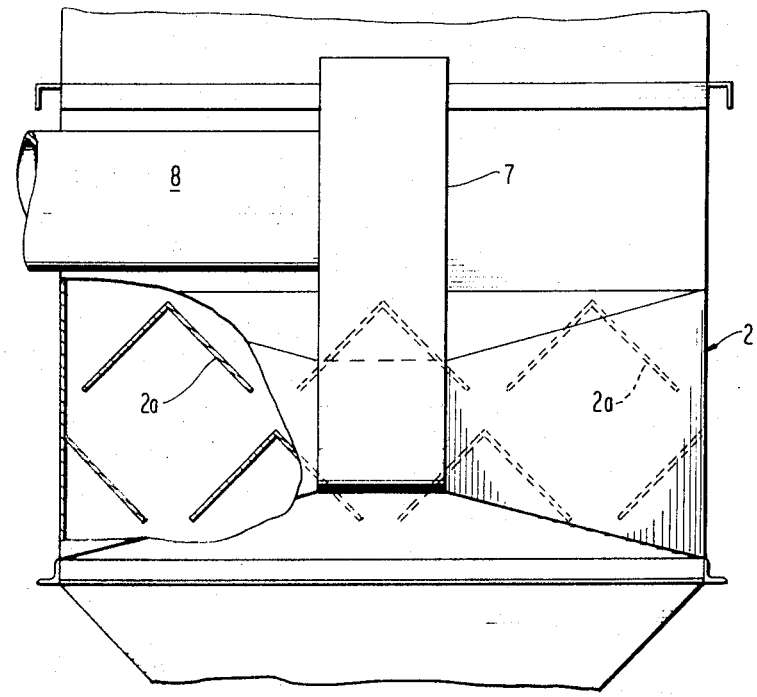

The details of the hopper 2 into which the moist grain is deposited are illustrated in FIGS. 1 and 4 wherein it will be seen that a plurality of baffles 2a are mounted within the hopper to interrupt the flow of grain being delivered thereto and to distribute hot air within the hopper being delivered therein by a fan 7 secured to the side of the hopper, the inlet of the fan being connected to one end of a conduit 8 having its opposite end connected to a hood 9 disposed above the heater 4. By this construction and arrangement, the moist grain is preheated before being discharged from the bottom of the hopper through a controlled discharge feeder 10 whereby a predetermined layer of preheated, moistened grain is deposited on the endless belt 3.

Figure 2:
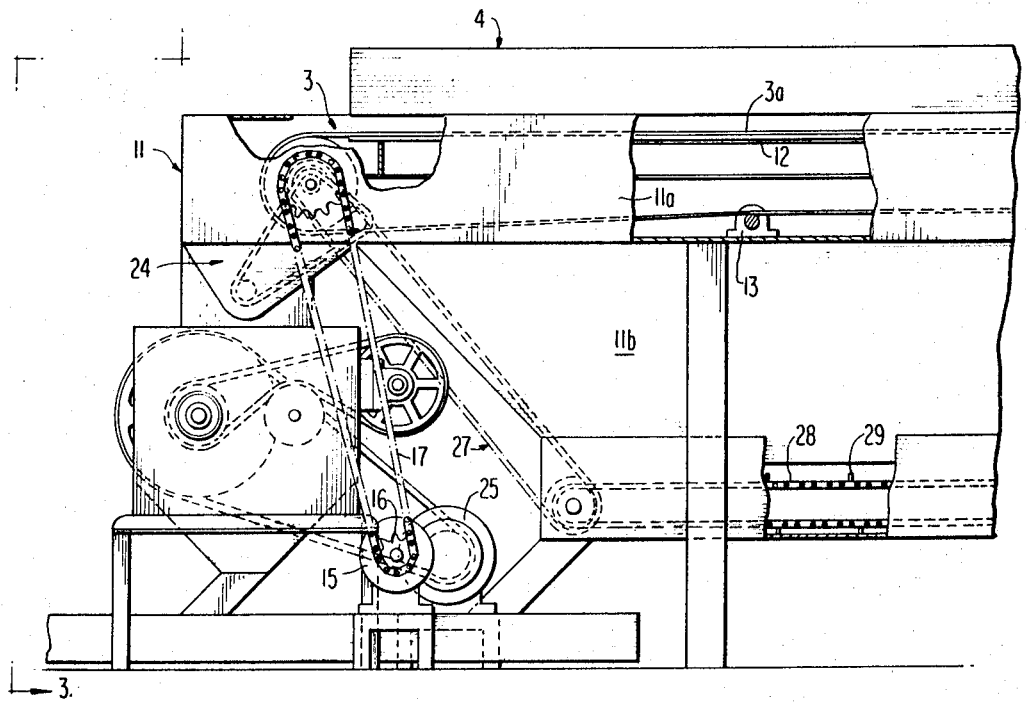
FIG. 2 is an enlarged, fragmentary, side elevational view of the rolling mill at the discharge end of the endless conveyor showing the details of the drive assembly for the conveyor belt and rolling mill.
Figure 3:
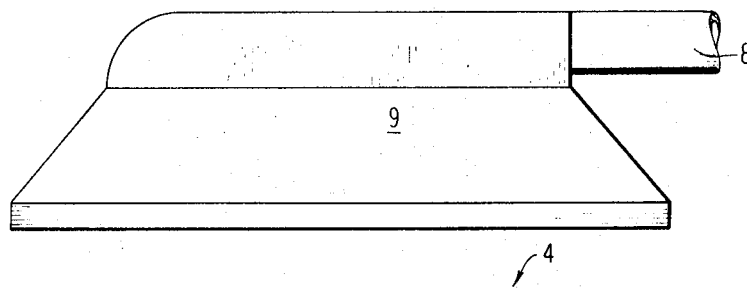
FIG. 3 is a fragmentary end elevational view taken along line 3—3 of FIG. 2.

As will be seen in FIGS. 1, 2 and 3, the endless conveyor 3 is mounted within a housing 11 having side walls 11a to which are secured a longitudinally extending frame member 12 which supports the upper run 3a of the endless belt conveyor as it passes under the heater 4, the lower run 3b of the endless conveyor being supported by roller bearings 13. The housing is supported by a plurality of leg members 14 secured to the lower edge portions of the side walls 11a, the upper edge portions of the side walls extending above the side edges of the upper run of the endless belt to contain the grain being carried thereon. The endless conveyor is driven by a motor 15 having a sprocket 16 which drives a chain 17 connected to a sprocket 18 secured to the end of the shaft of the conveyor drive roller 19. The drive roller 20 at the opposite end of the endless conveyor is journaled in the side walls 11a of the housing and is provided with a sprocket 21 which drives a chain 22 connected to the discharge feeder 10.

The upper run 3a of the endless conveyor carries a predetermined layer of moist grain under the heater 4, preferably an infra-red heater, which extends substantially the length of the endless conveyor whereby the preheated, moist grain is quick-cooked or heated thereby causing the inner moisture of the grain to expand and explode or "pop" the grain.

An auger conveyor 23 is mounted within the housing 11 below the endless conveyor 3 at the discharge end thereof, the flights of the auger being constructed and arranged to transversely feed the "popped" grain, being discharged from the endless conveyor, toward the center of the housing and into the rolling mill 5. The auger 23 is driven by a sprocket and chain assembly 24 connected to the conveyor belt drive roller 19.

The rolling mill 5 for crushing the "popped" grain comprises a pair of abutting rollers 5a, the nip portion of which is disposed beneath the center of the auger conveyor 23. The rollers are driven by a motor 25 through a pulley and belt assembly 26 connected to corresponding end shafts of the rollers.

A chain and sprocket assembly 27 is connected between drive roller 19 and an endless link chain 28 mounted within the bottom portion of the housing 11 below the convergent side walls 11b thereof. The chain is provided with a plurality of lugs 29 (FIG. 2) which engage the bottom wall or floor 11c of the housing to thereby scrape or drag any grain dust or fines which might drop from the endless conveyor.

The crushed grain together with the grain dust and fines are discharged into a horizontally disposed conduit 29 mounted beneath the rolling mill 5 and at the discharge end of the drag chain 28. The conduit 29 is connected to a vacuum source (not shown) whereby the popped, crushed grain is pneumatically conveyed to a packaging station.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. Grain treating and cooking apparatus of the character described comprising conveyor means, heater means disposed adjacent said conveyor means, means for feeding a predetermined layer of moist grain on said conveyor means, means driving said conveyor means through said heater means whereby the predetermined layer of moist grain disposed therein is quick-cooked or heated thereby causing the inner moisture of the grain to expand and explode the grain, second conveyor means disposed beneath the first conveyor means to collect grain dust and fines which fall from the first conveyor means, and roller mill means disposed at the discharge end of said first conveyor means for crushing the "popped" grain deposited therein from said first conveyor means.

2. Grain treating and cooking apparatus according to claim 1, wherein the means for feeding a predetermined layer of moist grain on said first conveyor means comprises, an auger conveyor, and nozzle means disposed within said auger conveyor whereby a fluid may be selectively sprayed on the grain being conveyed therein, to thereby increase the moisture content of the grain.

3. Grain treating and cooking apparatus according to claim 2, wherein a hopper is disposed between the auger conveyor and the first conveyor means, and fan means connected to said hopper and communicating with said heater means whereby hot air is blown into the hopper to thereby preheat the moist grain before it is delivered to the first conveyor means.

4. Grain treating and cooking apparatus according to claim 1, wherein the first conveyor means comprises a horizontally disposed endless belt assembly.

5. Grain treating and cooking apparatus according to claim 4, wherein the heater means comprises a horizontally disposed infra-red heater positioned above and extending substantially along the length of the upper run of the endless belt conveyor.

6. Grain treating and cooking apparatus according to claim 1, wherein auger means are mounted adjacent the discharge end of the first conveyor means for feeding the "popped" grain from the first conveyor means to said roller mill means.

7. Grain treating and cooking apparatus according to claim 6, wherein the roller mill means comprises a pair of abutting rollers having the nip portion thereof aligned with the discharge portion of the auger means.

8. Grain treating and cooking apparatus according to claim 1 wherein the second conveyor means comprises a horizontally disposed belt assembly.

9. Grain treating and cooking apparatus according to claim 8, wherein the first endless belt conveyor assembly and second endless conveyor assembly are mounted within a housing having a floor and side walls, the side walls extending above the side edges of the first endless belt conveyor assembly to thereby congain the grain being carried thereon; the second endless conveyor assembly being positioned adjacent the floor of the housing, said second endless conveyor assembly having lugs adapted to scrape the floor of the housing whereby the grain dust and fines are dragged from the housing floor and discharged therefrom adjacent the discharge end of the rolling mill.

10. Grain treating and cooking apparatus according to claim 9, wherein means are operatively connected to the roller mill means and second endless conveyor assembly for simultaneously driving the roller mill means and second endless conveyor assembly.

* * * * *